(12) United States Patent
Chin et al.

(10) Patent No.: US 9,327,711 B2
(45) Date of Patent: May 3, 2016

(54) CONTROL DEVICE AND CONTROL METHOD FOR AUTOMATIC TRANSMISSION

(71) Applicant: AISIN AW CO., LTD., Anjo-shi, Aichi-ken (JP)

(72) Inventors: Shishun Chin, Okazaki (JP); Kenta Kimata, Nagoya (JP); Masahiro Asai, Anjo (JP); Kazuhiko Motodohi, Anjo (JP); Shinichiro Iga, Moriyama (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/379,001

(22) PCT Filed: Dec. 26, 2012

(86) PCT No.: PCT/JP2012/083687
§ 371 (c)(1),
(2) Date: Aug. 15, 2014

(87) PCT Pub. No.: WO2013/140696
PCT Pub. Date: Sep. 26, 2013

(65) Prior Publication Data
US 2015/0032316 A1 Jan. 29, 2015

(30) Foreign Application Priority Data
Mar. 23, 2012 (JP) .................................. 2012-068139

(51) Int. Cl.
*B60W 10/00* (2006.01)
*B60W 10/30* (2006.01)
*B60K 6/52* (2007.10)
(Continued)

(52) U.S. Cl.
CPC ................. *B60W 10/30* (2013.01); *B60K 6/44* (2013.01); *B60K 6/52* (2013.01); *B60K 6/547* (2013.01); *B60W 10/08* (2013.01); *B60W 10/11* (2013.01); *B60W 10/115* (2013.01); *B60W 20/30* (2013.01); *F16H 61/0031* (2013.01); *B60W 20/00* (2013.01); *B60Y 2300/64* (2013.01);
(Continued)

(58) Field of Classification Search
CPC combination set(s) only.
See application file for complete search history.

(56) References Cited

U.S. PATENT DOCUMENTS

| 6,093,974 A | 7/2000 | Tabata et al. |
| 2002/0061803 A1* | 5/2002 | Aoki ........................ B60K 6/44 477/3 |

(Continued)

FOREIGN PATENT DOCUMENTS

| JP | A-2000-35122 | 2/2000 |
| JP | A-2004-364432 | 12/2004 |

(Continued)

*Primary Examiner* — Jonathan L Sample
(74) *Attorney, Agent, or Firm* — Oliff PLC

(57) ABSTRACT

A control device for a hybrid vehicle automatic transmission. The hybrid vehicle being capable of EV travel in which drive wheels are driven by only a rotary electric machine with the internal combustion engine stopped. The control device having an electric oil pump control device to drive an electric oil pump that supplies oil to the friction engagement element. A neutral control device performs disengagement control on the friction engagement element. A drag determination device determines whether conditions under which drag of the friction engagement element occurs are met because of a shortage in amount of oil to be supplied to a cancellation oil chamber of the friction engagement element by the electric oil pump during the EV travel started from a state in which the hybrid vehicle is stationary. Drag elimination control device provides a command to start the internal combustion engine.

7 Claims, 7 Drawing Sheets

(51) Int. Cl.
*B60K 6/547* (2007.10)
*B60W 10/08* (2006.01)
*F16H 61/00* (2006.01)
*B60W 10/11* (2012.01)
*B60K 6/44* (2007.10)
*B60W 10/115* (2012.01)
*B60W 20/00* (2016.01)
*F02D 29/02* (2006.01)

(52) U.S. Cl.
CPC .............. *F02D 29/02* (2013.01); *Y02T 10/623* (2013.01); *Y02T 10/6265* (2013.01); *Y10S 903/902* (2013.01)

(56) References Cited

U.S. PATENT DOCUMENTS

| | | | | |
|---|---|---|---|---|
| 2003/0064858 | A1* | 4/2003 | Saeki | B60K 6/44 477/166 |
| 2004/0249524 | A1 | 12/2004 | Ozeki et al. | |
| 2006/0272919 | A1* | 12/2006 | Kawamoto | F16H 61/061 192/85.63 |
| 2008/0149407 | A1* | 6/2008 | Shibata | B60K 6/40 180/65.27 |
| 2008/0173485 | A1* | 7/2008 | Kumazaki | B60K 6/365 180/65.28 |
| 2008/0318720 | A1 | 12/2008 | Fukuda et al. | |
| 2009/0042691 | A1* | 2/2009 | Matsubara | B60K 6/383 477/80 |
| 2009/0055061 | A1* | 2/2009 | Zhu | B60K 6/48 701/55 |
| 2010/0174473 | A1* | 7/2010 | Pursifull | F02D 41/042 701/112 |
| 2010/0250075 | A1 | 9/2010 | Suzuki et al. | |
| 2011/0118079 | A1* | 5/2011 | Mueller | B60K 6/387 477/5 |
| 2011/0238248 | A1* | 9/2011 | Suzuki | B60W 30/18072 701/22 |
| 2012/0059542 | A1* | 3/2012 | Kawai | B60K 6/48 701/22 |
| 2012/0108384 | A1* | 5/2012 | Tabata | B60K 6/445 477/3 |

FOREIGN PATENT DOCUMENTS

| | | |
|---|---|---|
| JP | A-2005-207303 | 8/2005 |
| JP | A-2005-349916 | 12/2005 |
| JP | A-2008-290613 | 12/2008 |
| JP | A-2009-58000 | 3/2009 |
| JP | A-2010-223399 | 10/2010 |

* cited by examiner

FIG. 3

|   | C-1 | C-2 | C-3 | B-1 | B-2 | F-1 |
|---|---|---|---|---|---|---|
| P |   |   |   |   |   |   |
| REV |   |   | ○ |   | ○ |   |
| N |   |   |   |   |   |   |
| 1ST | ○ |   |   |   | (○) | ○ |
| 2ND | ○ |   |   | ○ |   |   |
| 3RD | ○ |   | ○ |   |   |   |
| 4TH | ○ | ○ |   |   |   |   |
| 5TH |   | ○ | ○ |   |   |   |
| 6TH |   | ○ |   | ○ |   |   |

∗ (○): ENGINE BRAKE IN OPERATION

CONTROL DEVICE AND CONTROL METHOD FOR AUTOMATIC TRANSMISSION

TECHNICAL FIELD

The present invention relates to a control device for an automatic transmission mounted on a hybrid vehicle, for example, and in particular to a control device for a hybrid vehicle automatic transmission that controls the automatic transmission to a neutral state during EV travel and that supplies lubricating oil to a friction engagement element with an electric oil pump.

BACKGROUND ART

In recent years, a variety of hybrid vehicles have been developed to improve the fuel efficiency of the vehicles, for example, and some of such hybrid vehicles include an automatic transmission that changes the speed of rotation of an internal combustion engine during hybrid travel and engine travel (see Patent Document 1).

For the hybrid vehicle including an automatic transmission according to Patent Document 1, it is proposed to engage a first clutch (C-1) when lower shift speeds (for example, first to third forward speeds) are determined, and disengage the first clutch (C-1) when higher shift speeds (for example, fourth to sixth forward speeds) are determined, to bring the automatic transmission into a neutral state during EV travel performed by only the drive force of a motor/generator (hereinafter referred to simply as a "motor") with an internal combustion engine stopped.

In the automatic transmission for the hybrid vehicle described above, an output side (wheel side) member in the automatic transmission is rotated in an accompanying manner during EV travel, and therefore an electric oil pump is driven to supply lubricating oil to the automatic transmission.

RELATED-ART DOCUMENTS

Patent Documents

[Patent Document 1] Japanese Patent Application Publication No. 2010-223399 (JP 2010-223399 A)

SUMMARY OF THE INVENTION

Problem to be Solved by the Invention

In the case where a hydraulic servo for a clutch in the automatic transmission is rotated in an accompanying manner during EV travel, however, unintentional clutch drag may occur. Specifically, such drag may occur in the case where abrupt acceleration is performed in EV travel from a state in which the vehicle is stationary. When the vehicle is stationary, the hydraulic pressure in a working oil chamber of a hydraulic servo is kept at a predetermined pressure because of the hardware configuration. However, lubricating oil in a cancellation oil chamber for canceling a centrifugal hydraulic pressure in the working oil chamber is lost because rotation in the automatic transmission is stopped. In the case where abrupt acceleration is performed in EV travel from such a state, the cancellation oil chamber may be filled with an insufficient amount of lubricating oil if only a small amount of lubricating oil is supplied from the electric oil pump, and a piston may be moved to press friction plates because of a difference in centrifugal hydraulic pressure between the working oil chamber and the cancellation oil chamber, which may cause unintentional clutch drag to adversely affect the durability of the clutch.

In order to prevent unintentional clutch drag during EV travel, it is conceivable to increase the size of the electric oil pump to supply a large amount of lubricating oil to the cancellation oil chamber. However, increasing the size of the electric oil pump not only hinders improving the mountability of the electric oil pump to the vehicle but also hinders a cost reduction because a large-sized electric oil pump is expensive.

It is therefore an object of the present invention to provide a control device for a hybrid vehicle automatic transmission capable of preventing drag of a friction engagement element during EV travel and capable of improving the mountability of an electric oil pump to a vehicle and reducing the cost by reducing the size of the electric oil pump.

Means for Solving the Problem

The present invention (see FIGS. 1 to 7, for example) provides a control device (1) for a hybrid vehicle automatic transmission for use in a hybrid vehicle (100) having an automatic transmission (10) including a friction engagement element (C-1, C-2, C-3, B-1, B-2) provided in a power transfer path (L) between an internal combustion engine (2) and drive wheels (80fl, 80fr) and actuated by oil from a mechanical oil pump (31) driven by the internal combustion engine (2), the hybrid vehicle being capable of EV travel in which drive wheels (80rl, 80rr) are driven by only a rotary electric machine (20) with the internal combustion engine (2) stopped, the control device being characterized by including:

electric oil pump control means (45) for driving an electric oil pump (32) that supplies oil to the friction engagement element (for example, C-1);

neutral control means (46) for performing disengagement control on the friction engagement element (C-1, C-2, C-3, B-1, B-2) to bring the automatic transmission (10) into a neutral state during the EV travel;

drag determination means (51) for determining whether conditions (for example, TAc, TBc, TCc) under which drag of the friction engagement element (for example, C-1) occurs are met because of a shortage in amount of oil to be supplied to a cancellation oil chamber (115) of the friction engagement element (for example, C-1) by the electric oil pump (32) during the EV travel started from a state in which the hybrid vehicle is stationary; and drag elimination control means (52) for providing a command to start the internal combustion engine (2) to rotationally drive the mechanical oil pump (31) in the case where the drag determination means (51) determines that the conditions under which drag occurs are met.

Consequently, in the case where the drag determination means determines that the conditions under which drag of the friction engagement element occurs are met because of a shortage in amount of oil to be supplied to the cancellation oil chamber of the friction engagement element by the electric oil pump during EV travel, the drag elimination control means provides a command to start the internal combustion engine to rotationally drive the mechanical oil pump. Thus, a large amount of oil can be supplied from the mechanical oil pump to the cancellation oil chamber of the friction engagement element when drag of the friction engagement element is to occur (generation of drag is predicted), which prevents an occurrence of drag of the friction engagement element. Since an occurrence of drag can be prevented in this way, it is possible to reduce the size of the electric oil pump, and to improve the mountability of the electric oil pump to a vehicle and reduce the cost, compared to a case where an occurrence of drag is prevented by using a large-sized electric oil pump.

The present invention (see FIGS. 4 to 6, for example) further includes:

elapsed time measurement means (41) for measuring an elapsed time (t) from the EV travel is started from a state in which the hybrid vehicle is stationary; and vehicle speed sensing means (42) for sensing a vehicle speed (V) of the hybrid vehicle (100), and the conditions under which drag occurs are set to be met more easily as the elapsed time (t) is shorter and as the vehicle speed (V) is higher.

Consequently, the conditions under which drag occurs are set to be met more easily as the elapsed time from the start of EV travel is shorter and as the vehicle speed is higher. Thus, it is possible to accurately determine (predict) an occurrence of drag of the friction engagement element in accordance with the amount of oil to be supplied to the cancellation oil chamber of the friction engagement element by the electric oil pump. Consequently, it is possible to prevent an occurrence of drag of the friction engagement element as appropriate when drag of the friction engagement element is to occur (an occurrence of drag is predicted) as well as to prevent unnecessary starting of the internal combustion engine.

The present invention (see FIGS. 4 to 6, for example) further includes:

oil temperature sensing means (43) for sensing an oil temperature (T), and the conditions under which drag occurs are set to be met more easily as the oil temperature (T) is lower.

Consequently, the conditions under which drag occurs are set to be met more easily as the oil temperature is lower. Thus, it is possible to accurately determine (predict) an occurrence of drag of the friction engagement element in accordance with the amount of oil to be supplied to the cancellation oil chamber of the friction engagement element by the electric oil pump which varies in accordance with the oil temperature. Consequently, it is possible to prevent an occurrence of drag of the friction engagement element as appropriate when drag of the friction engagement element is to occur (an occurrence of drag is predicted) as well as to prevent unnecessary starting of the internal combustion engine.

In the present invention (see FIG. 6, for example), the conditions under which drag occurs are set to include a time from the internal combustion engine (2) is started until an idle rotational speed is reached as a safety margin (M).

Consequently, the conditions under which drag occurs are set to include the time from the internal combustion engine is started until the idle rotational speed is reached as the safety margin. Thus, starting of the internal combustion engine can be completed before drag of the friction engagement element occurs, which reliably prevents an occurrence of drag of the friction engagement element.

The present invention (see FIGS. 4 to 6, for example) further includes:

abnormality determination means (45a) for determining whether an abnormality is caused in the electric oil pump (32); and time measurement stopping means (41a) for stopping measurement of the elapsed time by the elapsed time measurement means (41) while the abnormality determination means (45a) determines that an abnormality is caused in the electric oil pump (32).

Consequently, the measurement of the elapsed time is stopped while oil may not be supplied to the cancellation oil chamber of the friction engagement element by the electric oil pump during EV travel when an abnormality is caused in the electric oil pump. Thus, the conditions under which drag of the friction engagement element occurs may be met in consideration of the time for which an abnormality is caused in the electric oil pump, which reliably prevents an occurrence of drag of the friction engagement element even if an abnormality is caused in the electric oil pump.

In the present invention (see FIGS. 4 to 6, for example), the abnormality determination means (45a) determines whether an abnormality is caused in the electric oil pump (32) at intervals of a predetermined time; and the control device further includes fault determination means (45b) for counting the number of times (N) that the abnormality determination means (45a) determines that an abnormality is caused, and determining that the electric oil pump (32) is broken and providing a command to start the internal combustion engine (2) to rotationally drive the mechanical oil pump (31) when the number of times exceeds a predetermined number of times ($\alpha$).

Consequently, when the number of times that it is determined that an abnormality is caused in the electric oil pump exceeds the predetermined number of times and it is determined that the electric oil pump is broken, a command to start the internal combustion engine is provided to rotationally drive the mechanical oil pump. Thus, the mechanical oil pump is reliably driven when the electric oil pump is broken, which reliably prevents an occurrence of drag of the friction engagement element.

The present invention (see FIGS. 4 to 6, for example) further includes:

elimination termination control means (53) for bringing the internal combustion engine (2) out of a drive state a predetermined time after the drag elimination control means (52) provides a command to start the internal combustion engine (2).

Consequently, the elimination termination control means brings the internal combustion engine out of a drive state a predetermined time after the drag elimination control means provides a command to start the internal combustion engine. Thus, it is possible to prevent the internal combustion engine from being driven uselessly after the cancellation oil chamber of the friction engagement element is filled with oil.

The symbols in the above parentheses are provided for reference to the drawings. Such symbols are provided for convenience to facilitate understanding of the present invention, and should not be construed as affecting the scope of the claims in any way.

BRIEF DESCRIPTION OF THE DRAWINGS

FIG. 3 is an engagement table of the hybrid vehicle automatic transmission.

MODES FOR CARRYING OUT THE INVENTION

An embodiment of the present invention will be described below with reference to FIGS. 1 to 7. First, an example of a hybrid vehicle to which the present invention can be provided will be described with reference to FIG. 1.

Figure 1:
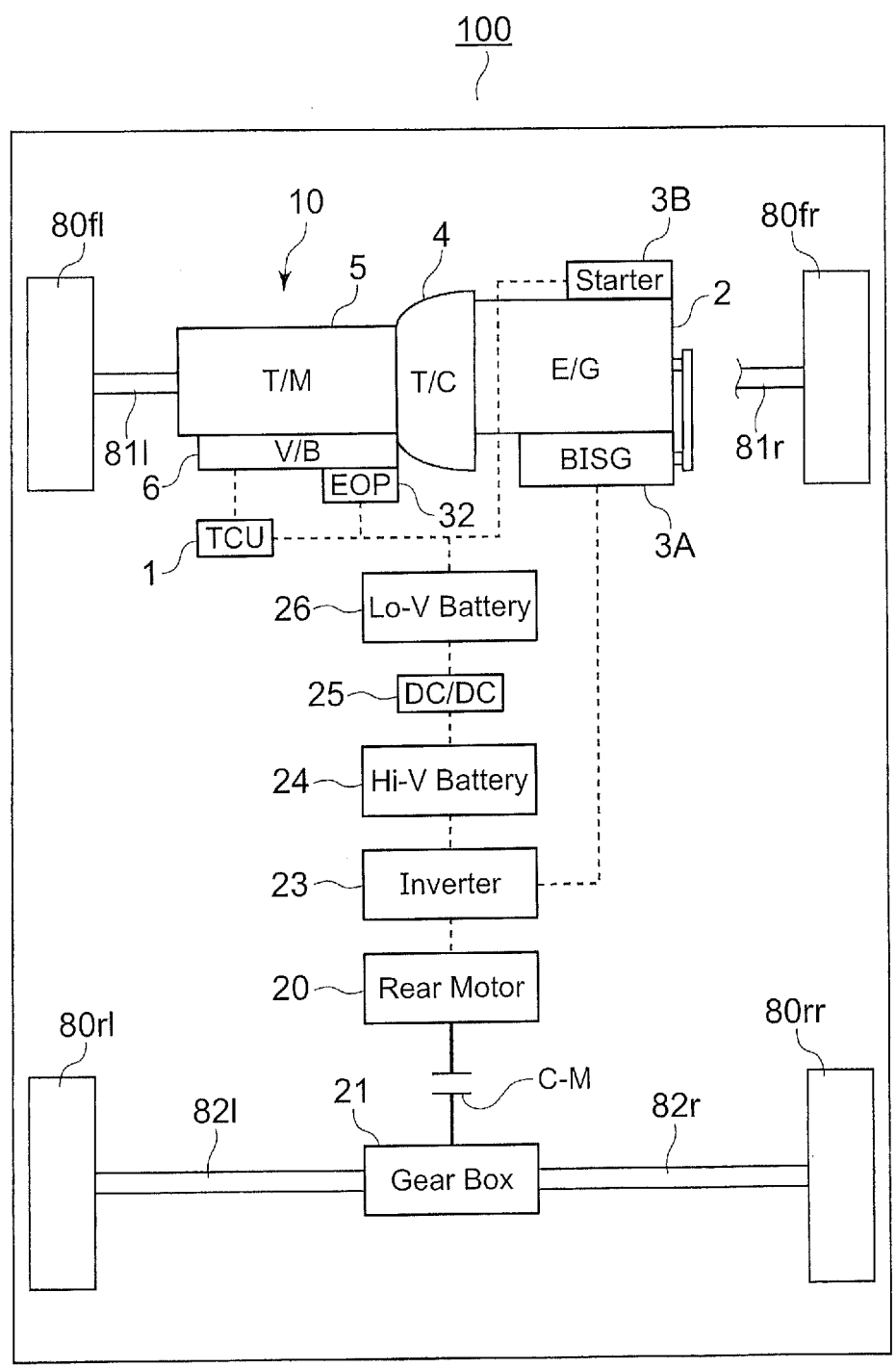
FIG. 1 is a schematic diagram illustrating a hybrid vehicle to which the present invention can be applied.

As illustrated in FIG. 1, a hybrid vehicle 100 according to the embodiment is a rear-motor hybrid vehicle, which is structured like a so-called FF (front-engine front-drive) vehicle including an internal combustion engine (E/G) 2 mounted on the front side and a hybrid vehicle automatic transmission (hereinafter referred to simply as an "automatic transmission") 10 mounted on a transfer path between the internal combustion engine 2 and left and right front wheels (drive wheels) 80fl, 80fr, and which also includes a rear motor (Rear Motor) (rotary electric machine) 20 drivably coupled to left and right rear wheels (drive wheels) 80rl, 80rr. That is, the hybrid vehicle 100 is configured to be able to be driven by the front wheels during engine travel, driven by the rear wheels during EV travel, and driven by the four wheels during hybrid travel.

More particularly, a belt integrated starter generator (Belt Integrated Starter Generator) 3A is connected to the internal combustion engine 2 to be able to start the internal combustion engine 2. The belt integrated starter generator (BISG) 3A is supplied with electric power from a high-voltage battery (Hi-V Battery) 24 via an inverter (Inverter) 23 to be able to start the internal combustion engine 2 with high output and charge the high-voltage battery 24 during starting (drive) of the internal combustion engine 2.

A starter (Starter) 3B is a starter driven by a common low-voltage battery (Lo-V Battery) 26 (a so-called 12-V power source). In the hybrid vehicle 100, the belt integrated starter generator (BISG) 3A is used to raise the rotational speed of the internal combustion engine 2 to a rotational speed higher than an idle rotational speed and thereafter ignite the internal combustion engine 2 at normal temperature (equal to or more than 0 degrees, for example), and the starter 3B is used to normally start the internal combustion engine 2 at low temperature (less than 0 degrees, for example).

The automatic transmission 10 to be discussed in detail later is connected to the internal combustion engine 2. The automatic transmission 10 roughly includes a torque converter (T/C) 4, an automatic speed change mechanism (T/M) 5, a hydraulic control device (V/B) 6, and so forth. The torque converter 4 is drivably coupled to the internal combustion engine 2. The automatic speed change mechanism (T/M) 5 is drivably coupled to the torque converter 4. The automatic speed change mechanism 5 is connected to left and right axles 811, 81r via a differential device D (see FIG. 2) as discussed in detail later to be drivably coupled to the left and right front wheels 80fl, 80fr.

The automatic speed change mechanism 5 is provided with the hydraulic control device (V/B) 6 which controls hydraulic pressures for friction engagement elements (clutches and brakes) to be discussed later. Solenoid valves etc. built in the hydraulic control device 6 are electronically controlled on the basis of an electronic command from a control section (TCU: Transmission Control Unit) (control device for a hybrid vehicle automatic transmission) 1. The hydraulic control device 6 is provided with an electric oil pump 32 driven independently of the internal combustion engine 2 as discussed in detail later so that a hydraulic pressure can be supplied from the electric oil pump 32 to the hydraulic control device 6.

The electric oil pump 32 and the control section 1 are driven using electric power of the low-voltage battery 26. The low-voltage battery 26 is connected to the high-voltage battery 24 via a DC/DC converter (step-down circuit) 25 to be supplied with electric power from the high-voltage battery 24.

The rear motor 20 is connected to the high-voltage battery 24 via the inverter 23 to be able to perform power running and regeneration. The rear motor 20 is drivably coupled to a gear box (Gear Box) 21 via a motor disconnecting clutch C-M. A speed reduction gear mechanism with a predetermined speed reduction ratio and a differential device (not illustrated) are built in the gear box 21. When the motor disconnecting clutch C-M is engaged, rotation of the rear motor 20 is transferred to the left and right rear wheels 80rl, 80rr with the speed reduction gear mechanism of the gear box 21 reducing the speed of the rotation and the differential device absorbing the difference in rotation between left and right axles 821, 82r.

Subsequently, the configuration of the automatic transmission 10 will be described with reference to FIG. 2. The automatic transmission 10 is disposed on a power transfer path L between the internal combustion engine 2 (see FIG. 1) and the left and right front wheels 80fl, 80fr. The automatic transmission 10 includes an input shaft 8 that can be connected to a crankshaft of the internal combustion engine 2, and the torque converter 4 and the automatic speed change mechanism 5 discussed above centered around the axial direction of the input shaft 8.

The torque converter 4 includes a pump impeller 4a connected to the input shaft 8 of the automatic transmission 10, a turbine runner 4b to which rotation of the pump impeller 4a is transferred via a working fluid, and a stator 4c that increases torque while adjusting the flow of oil returning from the turbine runner 4b to the pump impeller 4a. The turbine runner 4b is connected to an input shaft 12 of the automatic speed change mechanism 5 disposed coaxially with the input shaft 8. The torque converter 4 further includes a lock-up clutch 7. When the lock-up clutch 7 is engaged, rotation of the input shaft 8 of the automatic transmission 10 is directly transferred to the input shaft 12 of the automatic speed change mechanism 5.

When rotation of the turbine runner 4b falls below rotation of the pump impeller 4a, the stator 4c is fixed not to be rotated by a one-way clutch F so that the stator 4c receives a reaction force of the flow of oil to increase torque. When rotation of the turbine runner 4b exceeds rotation of the pump impeller 4a, the stator 4c runs idle so that the flow of oil is not applied in the negative direction.

In addition, a drive shaft 4d of the pump impeller 4a on the automatic speed change mechanism 5 side is drivably coupled to a drive gear 31a of a mechanical oil pump 31 disposed in a partition wall 9a fixed to a transmission case 9. An expandable space is formed between the drive gear 31a and a driven gear 31b meshed with the drive gear 31a to suction oil from a suction port (not illustrated) and compress and discharge oil to a discharge port (not illustrated) during drive rotation. That is, the mechanical oil pump 31 is drivably coupled so as to operate in conjunction with the internal combustion engine 2 via the input shaft 8. The mechanical oil pump 31 supplies the hydraulic control device 6 with oil for actuating friction engagement elements (clutches C-1, C-2, and C-3, and B-1 and B-2) to be discussed later during travel by the drive force of the internal combustion engine 2.

The automatic speed change mechanism 5 includes a planetary gear SP and a planetary gear unit PU provided on the input shaft 12. The planetary gear SP is a so-called single-pinion planetary gear, which includes a sun gear S1, a carrier CR1, and a ring gear R1 and in which the carrier CR1 includes a pinion P1 meshed with the sun gear S1 and the ring gear R1.

The planetary gear unit PU is a so-called Ravigneaux type planetary gear, which includes four rotary elements, namely a sun gear S2, a sun gear S3, a carrier CR2, and a ring gear R2 and in which the carrier CR2 includes a long pinion PL meshed with the sun gear S2 and the ring gear R2 and a short pinion PS meshed with the sun gear S3 in such a manner that the long pinion PL and the short pinion PS are meshed with each other.

The sun gear S1 of the planetary gear SP is connected to a boss of the partition wall 9a integrally fixed to the transmission case 9 so as not to be rotatable. The ring gear R1 makes the same rotation (hereinafter referred to as "input rotation") as rotation of the input shaft 12. Further, the carrier CR1 rotates at a speed reduced compared to the speed of the input rotation by the sun gear S1 which is fixed and the ring gear R1 which makes the input rotation. The carrier CR1 is connected to a clutch (friction engagement element) C-1 and a clutch (friction engagement element) C-3.

The sun gear S2 of the planetary gear unit PU is connected to a brake (friction engagement element) B-1 formed as a band brake so as to be selectively stationary with respect to the transmission case 9. The sun gear S2 is also connected to the clutch C-3 so as to selectively receive reduced-speed rotation of the carrier CR1 via the clutch C-3. The sun gear S3 is connected to the clutch C-1 so as to selectively receive reduced-speed rotation of the carrier CR1.

Further, the carrier CR2 is connected to a clutch (friction engagement element) C-2, to which rotation of the input shaft 12 is input, so as to selectively receive the input rotation via the clutch C-2. The carrier CR2 is also connected to a one-way clutch F-1 and a brake (friction engagement element) B-2 so as to be restricted from rotating in one direction with respect to the transmission case via the one-way clutch F-1 and so as to be selectively stationary (unrotatable) via the brake B-2. The ring gear R2 is connected to a counter gear 11. The counter gear 11 is connected to the wheels 80fl, 80fr via a counter shaft 15 and the differential, device D.

The clutch C-1 is structured to include friction plates 111 and a hydraulic servo 110 that engages and disengages the friction plates 111 with and from each other. The hydraulic servo 110 is structured to include a clutch drum 112 inside which a cylinder portion is formed, a piston 113 disposed to face the cylinder portion of the clutch drum 112 and disposed to be axially movable with respect to the clutch drum 112, a return plate 117 disposed to be axially immovable with respect to the clutch drum 112 by a snap ring 119, and a return spring 116 provided in a contracted state between the piston 113 and the return plate 117. A working oil chamber 114 is formed between the cylinder portion of the clutch drum 112 and the piston 113. A cancellation oil chamber 115 for canceling a centrifugal hydraulic pressure is formed between the piston 113 and the return plate 117.

A hydraulic servo 130 that engages and disengages the clutch C-3 and a hydraulic servo 120 that engages and disengages the clutch C-2 have the same configuration as that of the hydraulic servo 110 for the clutch C-1, and thus will not be described. A hydraulic servo 150 that engages and disengages the brake B-2 also has the same configuration as that of the hydraulic servo 110 for the clutch C-1 except that a cancellation oil chamber is not formed, and thus will not be described. Although not illustrated, a hydraulic servo for the brake B-1, which is a band brake, is disposed on the outer peripheral side of a clutch drum 132, and configured to selectively wind (tighten) the band brake around a drum portion of the clutch drum 132.

In the hybrid vehicle 100 configured as described above, during engine travel in which the drive force of the internal combustion engine 2 is used, the motor disconnecting clutch C-M illustrated in FIG. 1 is disengaged to disconnect the rear motor 20 from the wheels 80rl, 80rr. Then, in the automatic transmission 10, the control section 1 determines an optimum shift speed in accordance with the vehicle speed and the accelerator operation amount to electronically control the hydraulic control device 6. The speed of the drive force of the internal combustion engine 2 is changed with one of first to sixth forward speeds and a reverse speed established on the basis of the determined shift speed so that the drive force of the internal combustion engine 2 is transferred to the wheels 80fl, 80fr. The first to sixth forward speeds and the reverse speed of the automatic transmission 10 are established with the hydraulic servos 110, 120, 130, 150, and so forth operated such that the clutches C-1 to C-3, the brakes B-1 to B-2, and the one-way clutch F-1 are actuated (subjected to engagement control) in accordance with the operation table illustrated in FIG. 3 (that is, established in accordance with the state of an engagement pressure supplied to the working oil chamber of each hydraulic servo).

When a transition is made from the engine travel mode to hybrid travel, the motor disconnecting clutch C-M illustrated in FIG. 1 is engaged to drivably couple the rear motor 20 to the wheels 80rl, 80rr. This allows the drive force of the rear motor 20 to be appropriately used assistively or for regeneration on the basis of the accelerator operation amount (request for a drive force from a driver) in addition to the drive force of the internal combustion engine 2. That is, the hybrid vehicle 100 is driven using the drive force of the internal combustion engine 2 and the drive force of the rear motor 20.

During acceleration in the engine travel mode by the drive force of the internal combustion engine 2, the motor disconnecting clutch C-M may be disengaged to disconnect the rear motor 20 from the wheels 80rl, 80rr so as not to cause a travel resistance. Even during engine travel, the motor disconnecting clutch C-M is preferably engaged during deceleration so that the rear motor 20 applies regenerative braking, thereby improving the fuel efficiency.

During EV travel, the motor disconnecting clutch C-M illustrated in FIG. 1 is engaged to drivably couple the rear motor 20 to the wheels 80rl, 80rr, the internal combustion engine 2 is stopped, and neutral control means 46 to be discussed later (see FIG. 4) controls the hydraulic control device 6 such that the clutches C-2 to C-3 and the brakes B-1 to B-2 in the automatic transmission 10 are subjected to disengagement control so that the automatic transmission 10 is brought into a state in which the automatic transmission 10 can run idle (a neutral state). This allows the drive force of the rear motor 20 to be appropriately used for power running or regeneration on the basis of the accelerator operation amount (request for a drive force from a driver). That is, the hybrid vehicle 100 is driven using only the drive force of the rear motor 20.

During EV travel, members of the automatic speed change mechanism 5, which are drivably coupled to the wheels 80fl, 80fr (such as the differential device D, the counter shaft 15, the counter gear 11, and each gear of the planetary gear unit PU), are rotated in an accompanying manner, and the mechanical oil pump 31 is stopped as the internal combustion engine 2 is stopped. Thus, during EV travel, lubricating oil is supplied to portions to be lubricated of the automatic speed change mechanism 5 and the cancellation oil chambers (115 etc.) of the hydraulic servos 110, 120, and 130 by the electric oil pump 32 driven under control by electric oil pump control means 45 to be discussed later (see FIG. 4).

In the hybrid vehicle 100, as in Patent Document 1 (JP 2010-223399 A), in a travel state determined by the control section (TCU) 1 as corresponding to the first to third forward speeds on the basis of the vehicle speed and the accelerator operation amount, for example, during EV travel, the clutch C-1 is subjected to engagement control as preparation for a transition from EV travel to hybrid travel. Even if the clutch C-1 is engaged during EV travel, the automatic speed change mechanism 5 is in a towed state which is similar to the state during engine braking, and controlled to a state in which the automatic transmission 10 can run idle with the one-way clutch F-1 running idle. The hydraulic pressure for engagement control for the clutch C-1 is also generated by the electric oil pump 32.

In a travel state determined by the control section 1 as corresponding to the fourth to sixth forward speeds on the basis of the vehicle speed and the accelerator operation amount, for example, during EV travel, on the other hand, the automatic speed change mechanism 5 is controlled to a neutral state with a command provided to subject the clutch C-1, the clutch C-2, the clutch C-3, the brake B-1, and the brake B-2 to disengagement control for the purpose of preventing drag of the clutches and the brakes during high-speed travel. The control for the clutch C-1 during EV travel may be switched between engagement control and disengagement control in accordance with a determined vehicle speed rather than the determined shift speed described above.

In the neutral state, drag of the brake B-1 tends to occurs in the drum portion of the clutch drum 132 during high-speed rotation, because the brake B-1 which is a band brake is disposed so as to surround the periphery of the clutch drum 132. When drag of the brake B-1 occurs, rotation of the sun gear S2 receives a resistance in the direction of stopping its rotation with respect to the rotational state of the ring gear R2 which operates in conjunction with rotation of the wheels 80fl, 80fr as indicated in the velocity diagram illustrated in FIG. 7. Then the sun gear S3 is rotated in an accompanying manner in the direction of increasing its rotation as indicated by an arrow.

Figure 2:
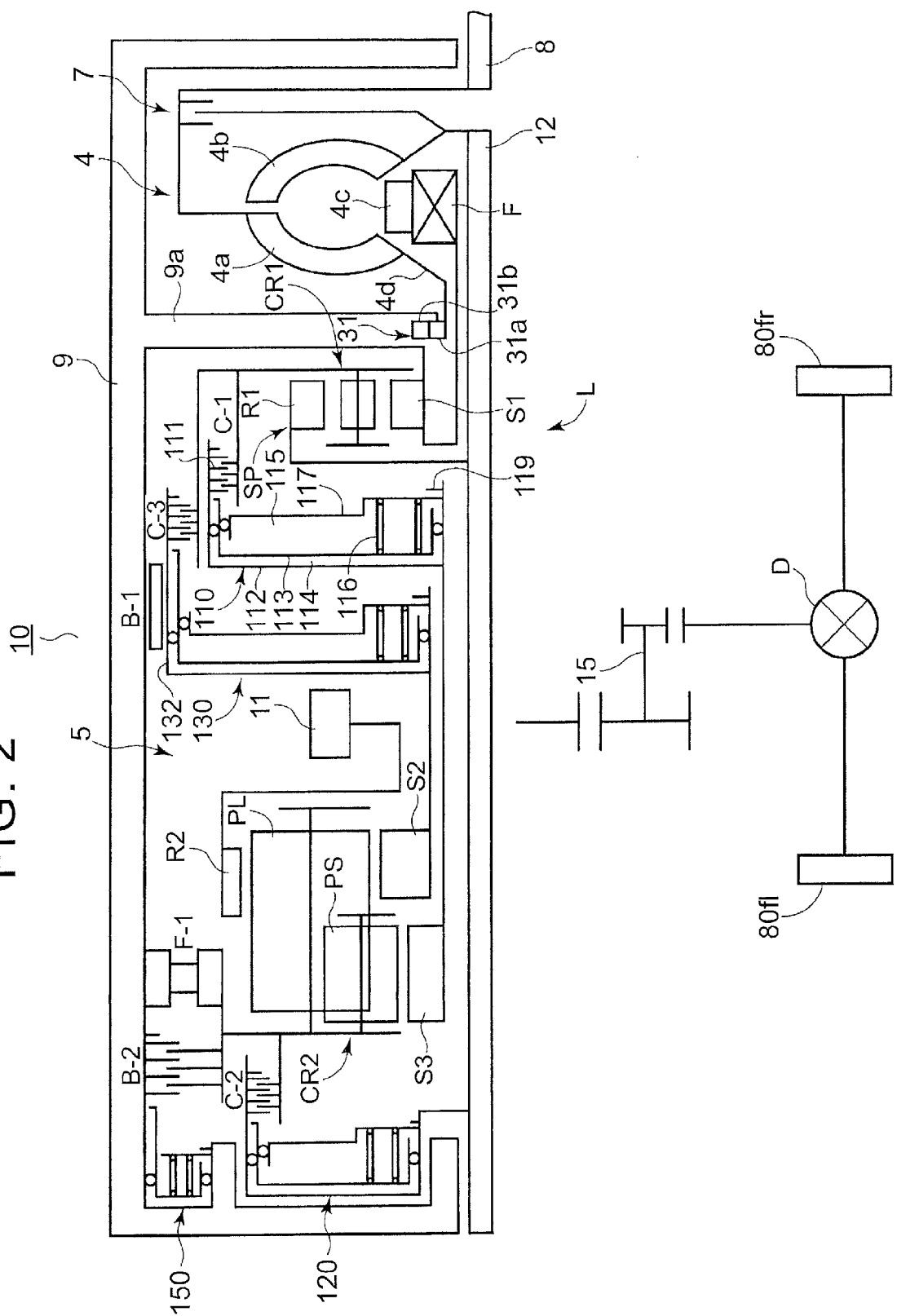
FIG. 2 is a schematic sectional diagram illustrating a hybrid vehicle automatic transmission.

When the sun gear S3 rotates, as illustrated in FIG. 2, the clutch drum 112 drivably coupled to the sun gear S3 is rotated in an accompanying manner. That is, the hydraulic servo 110 for the clutch C-1 (a friction engagement element) is rotated in an accompanying manner, and the working oil chamber 114 and the cancellation oil chamber 115 are also rotated in an accompanying manner. Thus, as the vehicle speed V is higher, the working oil chamber 114 and the cancellation oil chamber 115 are rotated at a higher speed.

Here, if the cancellation oil chamber 115 is filled with oil when the working oil chamber 114 and the cancellation oil chamber 115 are rotated as discussed above in the case where the clutch C-1 is disengaged, the piston 113 is not moved at all with a balance achieved between the respective centrifugal hydraulic pressures in the cancellation oil chamber 115 and the working oil chamber 114 which is generally filled with working oil. However, when the vehicle 100 is stationary during EV travel, for example, a centrifugal force is not exerted on oil in the cancellation oil chamber 115 which is open to the atmosphere, and therefore oil above the gap between the return plate 117 and the clutch drum 112 (in particular, above the input shaft 12) is lost.

The cancellation oil chamber 115, from half of which or more oil has been lost in this way, is gradually filled with lubricating oil supplied on the basis of a hydraulic pressure generated by the electric oil pump 32. However, in the case where abrupt acceleration is performed using the drive force of the rear motor 20, for example, the amount of oil to be supplied to the cancellation oil chamber 115 may be insufficient, and the piston 113 may be driven in the direction of pressing the friction plates 111 because of a difference in centrifugal hydraulic pressure between the working oil chamber 114 and the cancellation oil chamber 115 if a high rotational speed is reached before the cancellation oil chamber 115 is filled.

Examples of the case where the cancellation oil chamber 115 is not filled with oil in time are as follows. As the elapsed time from the start of EV travel after the vehicle becomes stationary is shorter, it is less likely that the cancellation oil chamber 115 is filled with oil in time, and it is more likely that drag of the clutch C-1 occurs. In addition, as the oil temperature is lower, lubricating oil flows worse, and it is less likely that the cancellation oil chamber 115 is filled with oil in time, and it is more likely that the clutch C-1 is dragged. Further, as the vehicle speed V is higher, the hydraulic servo 110 rotates at a higher speed to make the difference in centrifugal hydraulic pressure between the working oil chamber 114 and the cancellation oil chamber 115 larger, and it is more likely that the clutch C-1 is dragged.

Drag elimination control for preventing generation of drag of the clutch C-1 and the configuration of the control section 1 which performs the drag elimination control will be described below with reference to FIGS. 4 to 6.

Figure 4:
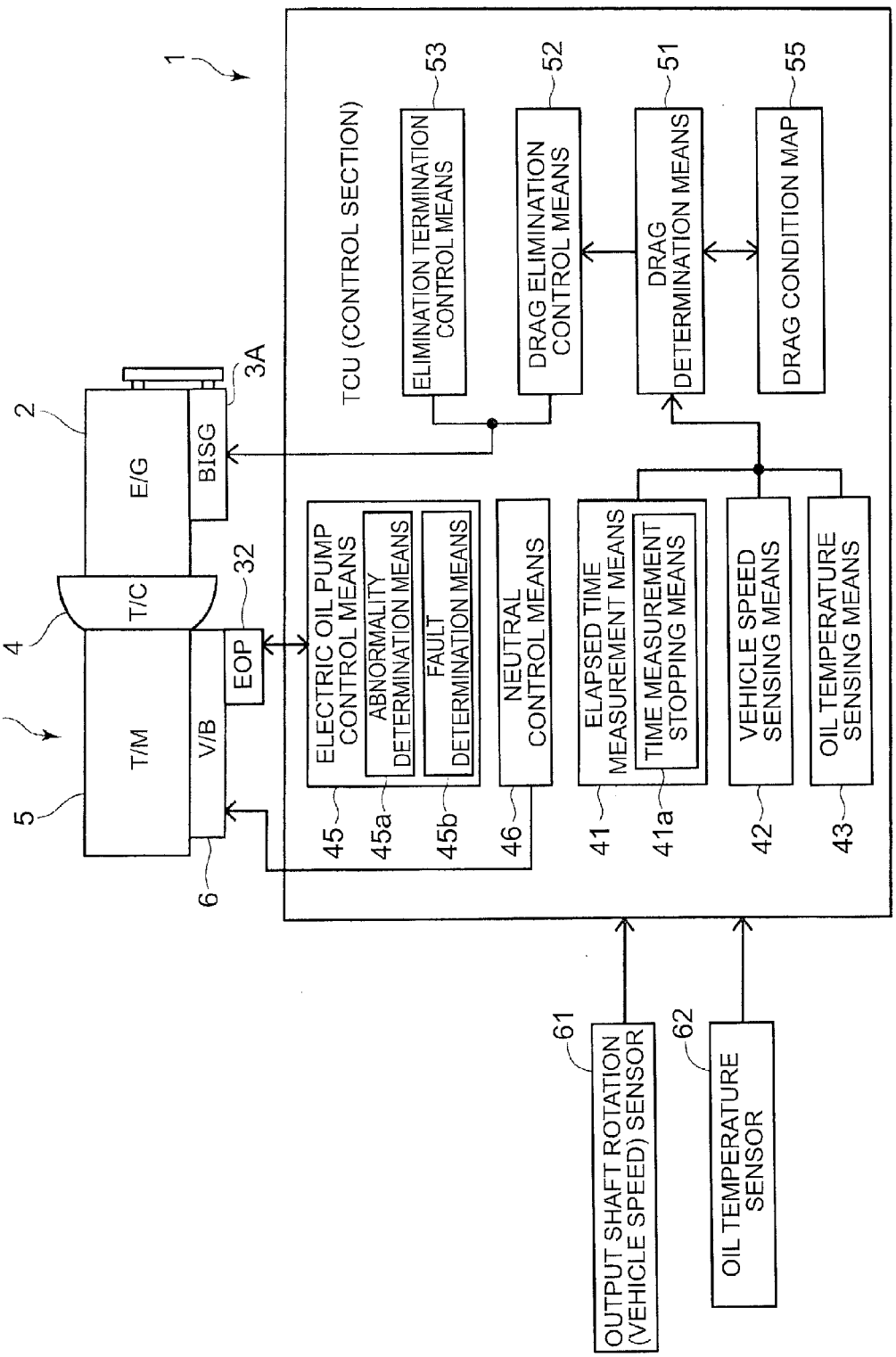
FIG. 4 is a block diagram illustrating a control device for the hybrid vehicle automatic transmission.

As illustrated in FIG. 4, the control section (TCU) 1 includes elapsed time measurement means 41 having time measurement stopping means 41a, vehicle speed sensing means 42, oil temperature sensing means 43, the electric oil pump control means 45 having abnormality determination means 45a and fault determination means 45b, the neutral control means 46, a drag condition map 55, drag determination means 51, drag elimination control means 52, elimination termination control means 53, and so forth. In addition, an output shaft rotation (vehicle speed) sensor 61 that detects the rotational speed of the counter gear 11 (or the counter shaft 15) and an oil temperature sensor 62 disposed in the hydraulic control device 6 to detect the oil temperature, for example, are connected to the control section 1.

Figure 5:
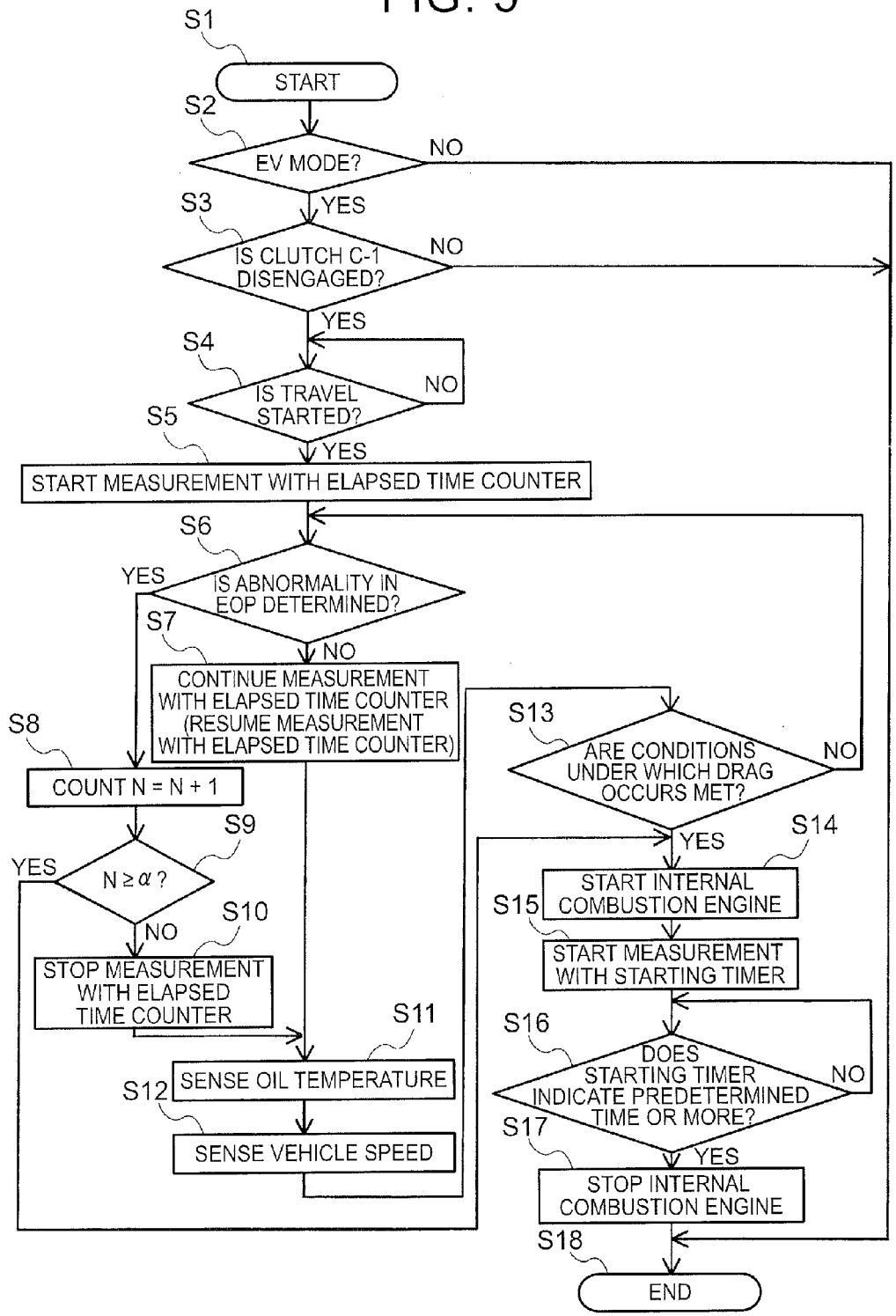
FIG. 5 is a flowchart illustrating drag elimination control.

As illustrated in FIG. 5, the control section 1 starts the drag elimination control according to the present invention (S1) when the ignition is turned on, for example. First, the control section 1 determines whether or not the vehicle is in EV travel (EV mode) (S2). In the case where the vehicle is not in EV travel (No in S2), that is, the vehicle is in engine travel or hybrid travel, the internal combustion engine 2 is driven, and therefore the mechanical oil pump 31 is rotationally driven. Since lubricating oil is supplied to the cancellation oil chamber 115 sufficiently, the process is ended (S12) without performing the drag elimination control.

In the case where the vehicle is in EV travel (Yes in S2), meanwhile, it is determined whether or not the clutch C-1 is disengaged (S3). During normal EV travel, as discussed above, the clutch C-1 is subjected to engagement control (No in S3) in the case where one of the first to third forward speeds is determined, for example. Thus, the process is ended (S12) without performing the drag elimination control.

On the other hand, the control section 1 performs disengagement control on the clutch C-1, and do not the clutch C-1, for example, even if one of the first to third forward speeds is determined when the oil temperature is lower than a predetermined temperature (for example, 0 degrees), for example. In such a case, the clutch C-1 is disengaged (Yes in S3), and the process proceeds to step S4, where the control section 1 stands by until the hybrid vehicle 100 starts EV travel from a stationary state (No in S4). If the vehicle speed sensing means 42, which senses the vehicle speed V of the hybrid vehicle 100 on the basis of a signal detected by the output shaft rotation (vehicle speed) sensor 61, senses that the vehicle speed V is not zero, it is determined that EV travel has been started (Yes in S4), and the elapsed time measurement means 41 starts measurement using an elapsed time counter (S5). That is, the elapsed time measurement means 41 measures the elapsed time from the start of EV travel.

Subsequently, the electric oil pump 32 should be driven by the electric oil pump control means 45 during EV travel, and the abnormality determination means 45a determines whether or not an abnormality is caused in the electric oil pump 32 (S6). It is determined that an abnormality is caused in the electric oil pump 32 on the basis of an error signal output from a driver installed in a computer provided in the electric oil pump 32, for example, and it is determined that the electric oil pump 32 is normal (not abnormal) on the basis of a normal signal output from the driver. The driver outputs an error signal when it is determined that rotation of the electric oil pump 32 is locked or the electric oil pump 32 is running idle on the basis of variations in current value or voltage value for the electric oil pump 32.

In the case where the abnormality determination means 45a determines in step S6 that an abnormality is not caused in the electric oil pump 32 (No in S6), the process proceeds to step S7, and the elapsed time measurement means 41 continues measuring the elapsed time from the start of EV travel.

On the other hand, in the case where the abnormality determination means 45a determines in step S6 that an abnormality is caused in the electric oil pump 32 (Yes in S6), first, the fault determination means 45b increments a count N, which indicates the number of times that it is determined that an abnormality is caused in the electric oil pump 32, by one to N+1 (S8), and determines whether or not the count N is over (equal to or more than) a predetermined number of times a (S9). Here, in the case where the count N, which indicates the number of times that it is determined that an abnormality is caused in the electric oil pump 32, is less than the predetermined number of times a (No in S9), the measurement of the elapsed time from the start of EV travel, which was started in step S5, is temporarily stopped (S10).

Subsequently, the oil temperature sensing means 43 senses oil temperature T of lubricating oil on the basis of the signal detected by the oil temperature sensor 62 (S11). Further, the vehicle speed sensing means 42 senses the vehicle speed V (S12). The process proceeds to step S13.

Then, in step S13, the drag determination means 51 references the drag condition map 55 on the basis of the "elapsed time t" of the elapsed time counter which started measurement in step S5 (including a case where the elapsed time counter was stopped in step S10), the "oil temperature T" sensed in step S6, and the "vehicle speed V" sensed in step S7 to determine whether or not conditions under which drag occurs are met.

Figure 6:
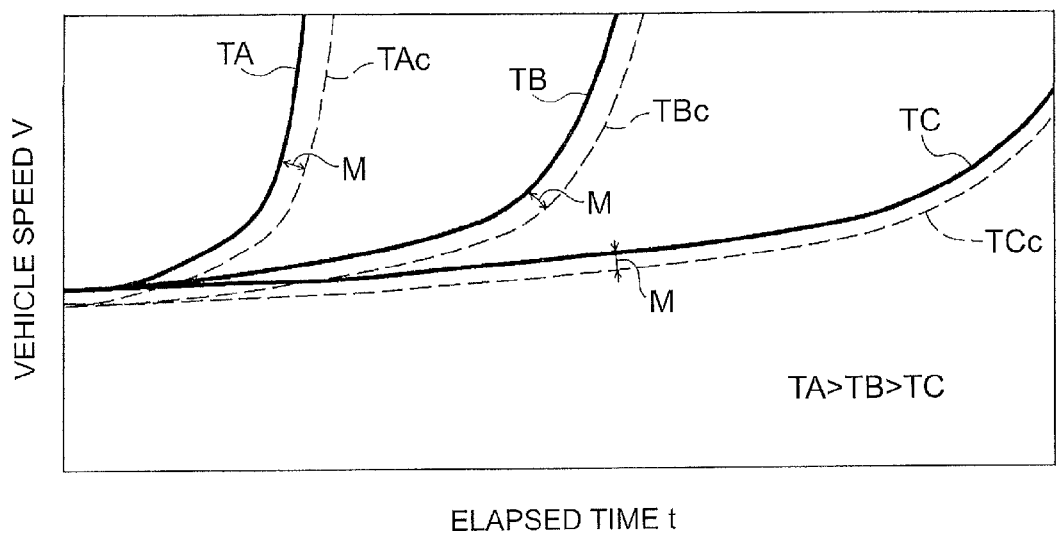
FIG. 6 is a drag condition map.
Figure 7:
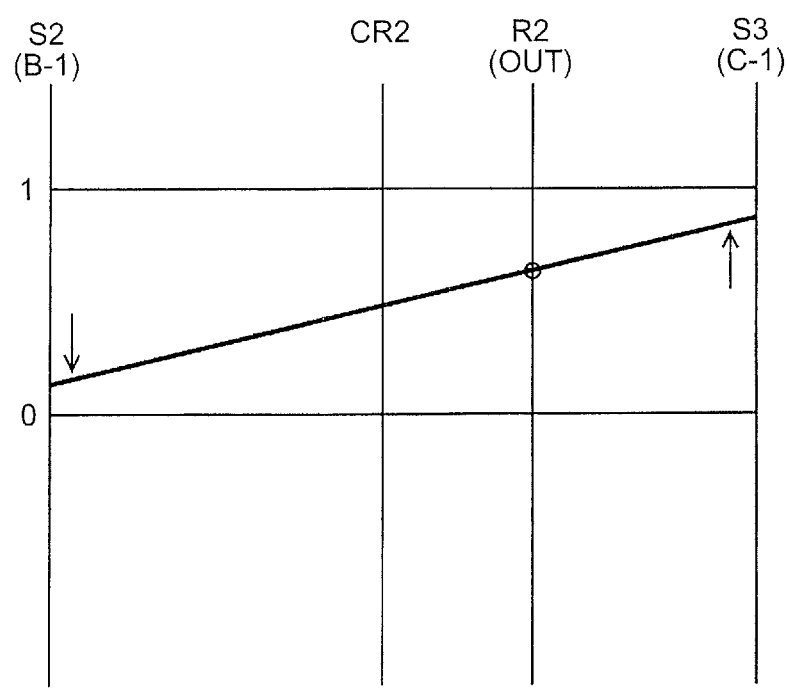
FIG. 7 is a velocity diagram for a planetary gear unit.

In the drag condition map 55, as illustrated in FIG. 6, drag starting boundary lines corresponding to oil temperatures TA, TB, and TC, for example, are recorded such that conditions under which drag occurs are met more easily as the "elapsed time t" of the elapsed time counter measured by the elapsed time measurement means 41 discussed above is shorter, as the "vehicle speed V" sensed by the vehicle speed sensing means 42 is higher, and as the "oil temperature T" sensed by the oil temperature sensing means 43 is lower (oil temperature TA>oil temperature TB>oil temperature TC). That is, drag conditions are met if a position on the drag condition map 55 based on the "elapsed time t", the "vehicle speed V", and the "oil temperature T" is on the upper left side in the drawing with respect to the drag starting boundary lines corresponding to the oil temperatures TA, TB, and TC.

In other words, as discussed above, as the elapsed time from the start of EV travel is shorter, it is less likely that oil is charged in time by the electric oil pump 32, and it is more likely that drag of the clutch C-1 occurs. As the oil temperature is lower, in addition, lubricating oil flows worse, and it is less likely that oil is charged in time, and it is more likely that drag of the clutch C-1 occurs. As the vehicle speed V is higher, further, the hydraulic servo 110 rotates at a higher speed to make the difference in centrifugal hydraulic pressure between the working oil chamber 114 and the cancellation oil chamber 115 larger, and it is more likely that drag of the clutch C-1 occurs. Thus, drag starting boundary lines corresponding to the oil temperatures TA, TB, and TC are set as conditions under which drag occurs.

In the case where the elapsed time counter is stopped in step S10, the "elapsed time t" does not indicate the time that has actually elapsed from the start of EV travel. However, the time for which oil is not supplied from the electric oil pump 32 to the cancellation oil chamber 115 of the clutch C-1 with an abnormality caused in the electric oil pump 32 is not added to the "elapsed time t". That is, the "elapsed time t" can be said to indicate the accumulated time for which oil is supplied to the cancellation oil chamber 115 of the clutch C-1 by the electric oil pump 32.

The ranges positioned on the upper left side in the drawing with respect to the drag starting boundary lines corresponding to the oil temperatures TA, TB, and TC are defined as boundary lines on which drag actually occurs due to an insufficient amount of oil in the cancellation oil chamber 115 of the clutch C-1. If oil is supplied to the cancellation oil chamber 115 by driving the mechanical oil pump 31 after drag of the clutch C-1 actually occurs, drag of the clutch C-1 occurs during the period. Thus, drag elimination control to be discussed in detail later is preferably started before the position based on the "elapsed time t", the "vehicle speed V", and the "oil temperature T" is included in the ranges defined by the drag starting boundary lines.

Thus, in the drag condition map 55, engine starting boundary lines TAc, TBc, and TCc including a safety margin M for the belt integrated starter generator 3A to raise the rotational speed of the internal combustion engine 2 to an idle rotational speed are set for the drag starting boundary lines corresponding to the oil temperatures TA, TB, and TC, respectively. In the embodiment, the drag determination means 51 determines the engine starting boundary lines TAc, TBc, and TCc as lines on which "conditions under which an occurrence of drag is predicted are met", In the drag condition map 55 illustrated in FIG. 6, the drag starting boundary lines corresponding to the three oil temperatures TA, TB, and TC and the three engine starting boundary lines TAc, TBc, and TCc including the safety margin M are recorded. For oil temperatures between the oil temperature TA and the oil temperature TB and between the oil temperature TB and the oil temperature TC, however, conditions under which drag occurs are preferably determined to be met using values obtained through linear interpolation between such boundary lines as appropriate.

In addition, in the drag condition map 55 illustrated in FIG. 6, in the cases where the oil temperature is higher than the oil temperature TA, the amount of lubricating oil to be supplied to the cancellation oil chamber 115 by the electric oil pump 32 is not insufficient for the acceleration performance of the hybrid vehicle 100 by the rear motor 20. Thus, in the cases where the oil temperature is higher than the oil temperature TA, it can be considered that drag does not occur, and it is not necessary to record conditions in the drag condition map 55.

In the drag condition map 55 illustrated in FIG. 6, in the cases where the oil temperature is lower than the oil temperature TC, on the contrary, it is predicted that little lubricating oil is supplied to the cancellation oil chamber 115 at a pressure generated by the electric oil pump 32 irrespective of the elapsed time t. Thus, an occurrence of drag may be determined when the vehicle speed V is higher than a certain vehicle speed.

The drag determination means 51 references the drag condition map 55 to determine whether or not the drag occurrence conditions are met as described above. In the case where the drag occurrence conditions are not met (No in S13), the process returns to step S6 as illustrated in FIG. 5. The routine from step S6 to step S13 is performed at intervals of a predetermined time. That is, the determination as to an occurrence of an abnormality in the electric oil pump 32 performed in step S6 is performed at intervals of a predetermined time.

Then, in the case where an occurrence of an abnormality in the electric oil pump 32 is not determined in step S6 (No in S6), the measurement with the elapsed time counter is continued (or in the case where the measurement with the elapsed time counter was stopped in the preceding step S10, the measurement with the elapsed time counter is resumed) (S7), and the oil temperature T and the vehicle speed V are sensed again (acquired again) in steps S11 and S12, respectively.

In the case where an occurrence of an abnormality in the electric oil pump 32 is determined in step S6 (Yes in S6), on the other hand, the count N is incremented by 1 (S8). If the count N is less than the predetermined number of times a (No in S9), the measurement with the elapsed time counter remains stopped (S10). That is, the time measurement stopping means 41a stops the measurement of the elapsed time by the elapsed time measurement means 41 while the abnormality determination means 45a determines the occurrence of an abnormality in the electric oil pump 32.

In the case where the count N exceeds the predetermined number of times a while the routine from step S6 to step S13 is repeated (Yes in S9), a fault of the electric oil pump 32 is determined. Thus, supply of oil from the electric oil pump 32 to the cancellation oil chamber 115 of the clutch C-1 is not expected, and it is highly likely that drag of the clutch C-1 occurs without supply of oil from the mechanical oil pump 31. In addition to drag of the clutch C-1, supply of lubricating oil to various portions may become insufficient, and hydraulic control may become uncontrollable. Thus, the process proceeds to step S14. In this case, supply of oil by the mechanical oil pump 31 is preferably continued, rather than the internal combustion engine 2 is stopped in step S17 to be discussed later.

In the case where the drag determination means 51 determines that the drag occurrence conditions are met (or that the conditions under which an occurrence of drag is predicted discussed above are met) while the routine from step S6 to step S13 is repeated (Yes in S13), on the other hand, the drag elimination control means 52 commands the belt integrated starter generator 3A to start the internal combustion engine 2 as indicated in FIG. 4 (S14). Consequently, the mechanical oil pump 31 (see FIG. 2), which operates in conjunction with the internal combustion engine 2, is rotationally driven, a lubricating oil pressure that is higher than that when the electric oil pump 32 is driven is generated in the hydraulic control device 6, and a large amount of lubricating oil is supplied to the cancellation oil chamber 115 to rapidly fill the cancellation oil chamber 115 with oil.

When the internal combustion engine 2 is started in this way, the elimination termination control means 53 starts measurement with a starting timer (S15), that is, starts measuring the time for which the internal combustion engine 2 is driven. The elimination termination control means 53 stands by until the starting timer indicates a predetermined time or more (No in S16). When the starting timer indicates the predetermined time or more (Yes in S16), the elimination termination control means 53 provides a command to stop injecting fuel to the internal combustion engine 2 to bring the internal combustion engine 2 out of a drive state (S17). The drag elimination control is thus ended (S18). The predetermined time (starting timer) is a time before the cancellation oil chamber 115 is sufficiently charged by drive of the mechanical oil pump 31, and is about a few seconds (for example, about two to three seconds).

In step S17, the internal combustion engine 2 may be brought out of a drive state by transmitting a status signal that permits the internal combustion engine 2 to stop to the internal combustion engine 2, rather than providing a command to stop fuel injection described above, so that the internal combustion engine 2 detelmines to stop.

According to the control section 1, as described above, in the case where the drag determination means 51 determines that the conditions under which drag of the clutch C-1 occurs are met because of a shortage in amount of oil to be supplied to the cancellation oil chamber 115 of the clutch C-1 by the electric oil pump 32 during EV travel, the drag elimination control means 52 provides a command to start the internal combustion engine 2 to rotationally drive the mechanical oil pump 31. Thus, a large amount of oil can be supplied from the mechanical oil pump 31 to the cancellation oil chamber 115 of the clutch C-1 when drag of the clutch C-1 occurs (an occurrence of drag is predicted), which prevents an occurrence of drag of the clutch C-1. Since an occurrence of drag can be prevented in this way, it is possible to reduce the size of the electric oil pump 32, and to improve the mountability of the electric oil pump 32 to a vehicle and reduce the cost, compared to a case where an occurrence of drag is prevented using a large-sized electric oil pump.

In addition, the conditions under which drag occurs are set to be met more easily as the elapsed time t from the start of EV travel is shorter and as the vehicle speed V is higher. Thus, it is possible to accurately determine (predict) an occurrence of drag of the clutch C-1 in accordance with the amount of oil to be supplied to the cancellation oil chamber 115 of the clutch C-1 by the electric oil pump 32. Consequently, it is possible to prevent an occurrence of drag of the clutch C-1 as appropriate when drag of the clutch C-1 is to occur (an occurrence of drag is predicted) as well as to prevent unnecessary starting of the internal combustion engine 2.

Further, the conditions under which drag occurs are set to be met more easily as the oil temperature T is lower. Thus, it is possible to accurately determine (predict) an occurrence of drag of the clutch C-1 in accordance with the amount of oil to be supplied to the cancellation oil chamber 115 of the clutch C-1 by the electric oil pump 32 which varies in accordance with the oil temperature T. Consequently, it is possible to prevent an occurrence of drag of the clutch C-1 as appropriate when drag of the clutch C-1 is to occur (an occurrence of drag is predicted) as well as to prevent unnecessary starting of the internal combustion engine 2.

In addition, in particular, the conditions under which drag occurs are set to include the time from the internal combustion engine 2 is started until an idle rotational speed is reached as the safety margin M. Thus, starting of the internal combustion engine 2 can be completed before drag of the clutch C-1 occurs, which reliably prevents an occurrence of drag of the clutch C-1.

Further, the measurement with the elapsed time counter is stopped while oil may not be supplied to the cancellation oil chamber 115 of the clutch C-1 by the electric oil pump 32 during EV travel when an abnormality is caused in the electric oil pump 32. Thus, the conditions under which drag of the clutch C-1 occurs may be met in consideration of the time for which an abnormality is caused in the electric oil pump 32, which reliably prevents an occurrence of drag of the clutch C-1 even if an abnormality is caused in the electric oil pump 32.

In addition, when the count N, which indicates the number of times that it is determined that an abnormality is caused in the electric oil pump 32, exceeds the predetermined number of times a and it is determined that the electric oil pump 32 is broken, a command to start the internal combustion engine 2 is provided to rotationally drive the mechanical oil pump 31. Thus, the mechanical oil pump 31 is reliably driven when the electric oil pump 32 is broken, which reliably prevents an occurrence of drag of the clutch C-1.

Then, the elimination termination control means 53 provides a command to stop the internal combustion engine 2 a predetermined time after the drag elimination control means 52 provides a command to start the internal combustion engine 2. Thus, it is possible to prevent the internal combustion engine 2 from being driven uselessly after the cancellation oil chamber 115 of the clutch C-1 is filled with oil.

In the embodiment described above, an example is explained in which the automatic transmission 10 is applied to the rear-motor hybrid vehicle 100. However, the present invention is not limited thereto, and may be applied to any hybrid vehicle on which an automatic transmission is mounted and in which the amount of oil to be supplied to a cancellation oil chamber of a friction engagement element by an electric oil pump may be insufficient during EV travel. As a matter of course, the hybrid vehicle includes a plug-in hybrid vehicle that may be charged for EV travel.

In the embodiment, the automatic transmission 10 is a multi-speed automatic transmission that establishes six forward speeds and a reverse speed. However, the present invention is not limited thereto, and may be applied to a multi-speed automatic transmission that establishes seven or more forward speeds or five or less forward speeds, or a belt, toroidal, or ring-cone continuously variable transmission.

In the embodiment, in addition, the hydraulic servo 110 for the clutch C-1 is rotated during EV travel to cause drag. However, the present invention may also be applied to any friction engagement element other than the clutch C-1 in which drag of the friction engagement element occurs because of a shortage of oil in a cancellation oil chamber.

In the embodiment, further, for a phrase "to determine that conditions under which drag occurs are met", a determination is made in accordance with whether or not the engine starting boundary lines TAc, TBc, and TCc in the drag condition map illustrated in FIG. 6 are exceeded by the vehicle speed V or the elapsed time t, that is, the phrase means "to predict and determine an occurrence of drag" for the time for which the rotational speed of the internal combustion engine 2 is raised to an idle rotational speed. However, the present invention is not limited thereto, and the phrase may mean "to determine an actual occurrence of drag". That is, the phrase may mean "to determine an occurrence of drag" using the "drag starting boundary lines corresponding to the oil temperatures TA, TB, and TC" illustrated in FIG. 6. Further, the phrase may mean "to determine actual an occurrence of drag" from the result of variations in rotational acceleration of the input shaft 12 sensed using an input shaft rotational speed sensor or the like.

In the embodiment, in addition, the clutch C-1 is engaged when one of the first forward speed to the third forward speed is determined during EV travel. During EV travel, however, the automatic transmission 10 may be brought into a neutral state at all times by bringing all the clutches and the brakes into a completely disengaged state.

INDUSTRIAL APPLICABILITY

The control device for a hybrid vehicle automatic transmission according to the present invention can be used for hybrid vehicles such as passenger cars and trucks, and is particularly suitable for use in hybrid vehicles for which it is desired to prevent drag of a friction engagement element during EV travel and to reduce the size of an electric oil pump.

DESCRIPTION OF THE REFERENCE NUMERALS

1 CONTROL DEVICE FOR HYBRID VEHICLE AUTOMATIC TRANSMISSION (CONTROL SECTION)
2 INTERNAL COMBUSTION ENGINE
10 HYBRID VEHICLE AUTOMATIC TRANSMISSION (AUTOMATIC TRANSMISSION)
20 ROTARY ELECTRIC MACHINE (MOTOR)
31 MECHANICAL OIL PUMP
32 ELECTRIC OIL PUMP
41 ELAPSED TIME MEASUREMENT MEANS
41a TIME MEASUREMENT STOPPING MEANS
42 VEHICLE SPEED SENSING MEANS
43 OIL TEMPERATURE SENSING MEANS
45a ABNORMALITY DETERMINATION MEANS
45b FAULT DETERMINATION MEANS
51 DRAG DETERMINATION MEANS
52 DRAG ELIMINATION CONTROL MEANS
53 ELIMINATION TERMINATION CONTROL MEANS
100 VEHICLE (HYBRID VEHICLE)
115 CANCELLATION OIL CHAMBER
C-1 FRICTION ENGAGEMENT ELEMENT (CLUTCH)
C-2 FRICTION ENGAGEMENT ELEMENT (CLUTCH)
C-3 FRICTION ENGAGEMENT ELEMENT (CLUTCH)
B-1 FRICTION ENGAGEMENT ELEMENT (BRAKE)
B-2 FRICTION ENGAGEMENT ELEMENT (BRAKE)
M SAFETY MARGIN
N NUMBER OF TIMES THAT OCCURRENCE OF ABNORMALITY IS DETERMINED
T OIL TEMPERATURE
V VEHICLE SPEED
t ELAPSED TIME
α PREDETERMINED NUMBER OF TIMES

The invention claimed is:

1. A control device for a hybrid vehicle automatic transmission for use in a hybrid vehicle having an automatic transmission including a friction engagement element provided in a power transfer path between an internal combustion engine and drive wheels and actuated by oil from a mechanical oil pump driven by the internal combustion engine, the hybrid vehicle being capable of EV travel in which drive wheels are driven by only a rotary electric machine with the internal combustion engine stopped, the control device comprising:
 electric oil pump controller configured to drive an electric oil pump that supplies oil to the friction engagement element;
 neutral controller configured to disengage the friction engagement element to bring the automatic transmission into a neutral state during the EV travel;
 drag determination device configured to determine whether conditions under which drag of the friction engagement element occurs are met because of a shortage in amount of oil to be supplied to a cancellation oil chamber of the friction engagement element by the electric oil pump during the EV travel started from a state in which the hybrid vehicle is stationary;

drag elimination controller configured to provide a command to start the internal combustion engine to rotationally drive the mechanical oil pump in the case where the drag determination device determines that the conditions under which drag occurs are met; and vehicle speed sensing means for sensing a vehicle speed of the hybrid vehicle, wherein the conditions under which drag occurs are set to be met more easily as the vehicle speed is higher.

2. The control device for a hybrid vehicle automatic transmission according to claim 1, further comprising:

elapsed time measurement means for measuring an elapsed time from the EV travel is started from a state in which the hybrid vehicle is stationary;

wherein the conditions under which drag occurs are set to be met more easily as the elapsed time is shorter.

3. The control device for a hybrid vehicle automatic transmission according to claim 2, further comprising:

oil temperature sensing means for sensing an oil temperature, wherein the conditions under which drag occurs are set to be met more easily as the oil temperature is lower.

4. The control device for a hydraulic vehicle automatic transmission according to claim 2, wherein the conditions under which drag occurs are set to include a time from the internal combustion engine is started until an idle rotational speed is reached as a safety margin.

5. The control device for a hybrid vehicle automatic transmission according to claim 2, further comprising:

abnormality determination means for determining whether an abnormality is caused in the electric oil pump; and time measurement stopping means for stopping measurement of the elapsed time by the elapsed time measurement means while the abnormality determination means determines that an abnormality is caused in the electric oil pump.

6. The control device for a hydraulic vehicle automatic transmission according to claim 5, wherein:

the abnormality determination means determines whether an abnormality is caused in the electric oil pump at intervals of a predetermined time; and the control device further comprises fault determination means for counting the number of times that the abnormality determination means determines that an abnormality is caused, and determining that the electric oil pump is broken and providing a command to start the internal combustion engine to rotationally drive the mechanical oil pump when the number of times exceeds a predetermined number of times.

7. The control device for a hybrid vehicle automatic transmission according to claim 1, further comprising:

elimination termination control means for bringing the internal combustion engine out of a drive state a predetermined time after the drag elimination control means provides a command to start the internal combustion engine.

* * * * *